Aug. 25, 1964 M. A. BOEHLY ETAL 3,146,314
MEANS FOR GENERATING WARBLING TONE RINGING SIGNALS IN A TIME DIVISION MULTIPLEX COMMUNICATION SYSTEM
Filed Sept. 25, 1961
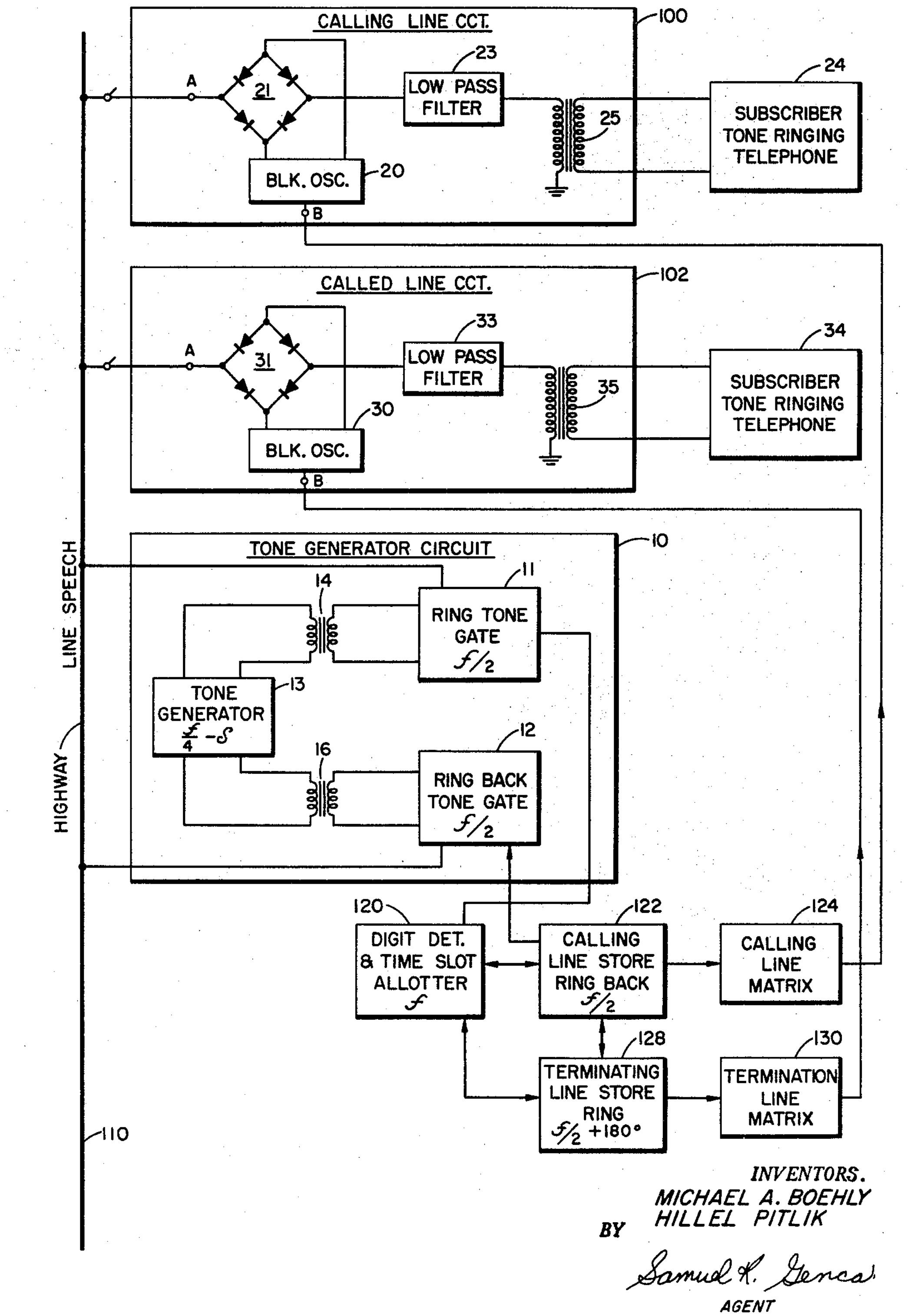
INVENTORS.
MICHAEL A. BOEHLY
HILLEL PITLIK
BY Samuel R. Genca
AGENT United States Patent Office 3,146,314
Patented Aug. 25, 1964

3,146,314

MEANS FOR GENERATING WARBLING TONE RINGING SIGNALS IN A TIME DIVISION MULTIPLEX COMMUNICATION SYSTEM

Michael A. Boehly and Hillel Pitlik, Rochester, N.Y., assignors to General Dynamics Corporation, Rochester, N.Y., a corporation of Delaware Filed Sept. 25, 1961, Ser. No. 141,259
5 Claims. (Cl. 179—84)

The present invention relates to an automatic communication system and, more particularly, to a new and improved means for generating warbling tone ringing signals in a time division multiplex telephone system.

The copending application of Brightman, Serial No. 45,342, filed July 26, 1960, and assigned to the same assignee as the present invention, discloses a time division multiplex communication system in which connections between line circuits and trunk circuits are carried on over a speech highway. All of the circuits are connected to the speech highway and one data highway, while the trunk circuits are connected to the speech highway and two separate one-way data highways. The system uses "floating" time slots that are assigned to calling circuits and the calling and called line circuits are connected to the speech and data highways under the control of delay lines which circulate calling and called circuit designations in the assigned time slot.

The cited Brightman application discloses a means for sending a calling signal over the common communication channel. Each calling and called line circuit is repetitively connected to the common channel for only a brief transfer period, i.e., a time slot during which energy is transferred between the calling and called line circuits. In a time division multiplex communication system, circuit components such as transistors and diodes, as well as circuit parameters which include voltage, current and power dissipation, prevent the excitation of a conventional telephone type ringer. It is not possible to pass sufficient power over the communication channel to operate conventional telephone type ringers. Accordingly, electronic telephone communication systems employ a low power consumption signaling device which is conventionally referred to as a tone ringer. The tone ringer, in response to a singly interrupted audio ringing signal, emits a beep tone.

In such systems, the operating frequencies are selected in accordance with the amount of traffic and the response of the various components and circuit parameters of the system. In order to minimize ringing crosstalk caused by stray capacitance in the transmission line, it is desirable to maintain the ringing energy level in the speech highway at the lowest possible level. Thus, it is a problem to maintain the attention-attracting qualities and power level of singly interrupted audio ringing signals in time division multiplex transmission systems.

Accordingly, it is the principal object of the present invention to provide a novel and improved means for generating attention-attracting tone ringing signals in time division multiplex telephone systems.

It is another object of the present invention to provide an audible warbling ringing signal in a time division multiplex telephone system.

It is still another object of the present invention to provide a higher signal ringing level than singly interrupted audible ringing signals without increasing the speech highway ringing current.

It is another object of the present invention to provide high ringing power levels without increasing ringing crosstalk.

It is still another object of the present invention to provide higher peak ringing signal level outputs without increasing power level inputs.

Other objects, features and advantages of the present invention will become more apparent from the following detailed description, taken together with the accompanying drawing in which the sole figure is a block and schematic diagram of a preferred embodiment of the invention.

For convenience, the elements of this invention, which correspond closely with similar elements in the cited Brightman application, have been given the same three-digit numerical designation which are employed in the cited Brightman application; other components are assigned a two-digit identifying number. For example, the calling line store 122, shown in the drawing, corresponds directly with the calling line store 122 shown in FIGURE 1 of the referenced Brightman application.

Elements 124 and 130 represent, respectively, a calling line matrix and a terminating line matrix which comprise a plurality of gate circuits, as more fully explained in the cited Brightman application.

The terminating line store 128 stores the dialed designation of the called line and auxiliary circuits, not shown, to determine whether the circuit represented by the dialed number is in an idle or busy condition. In addition, the delay line register in the terminating line store 128 controls translating circuits in the terminating line matrix 130 so that the called line circuit 102 is connected to the speech highway 110 and data highway, not shown, the the time position allotted to the calling line circuit 100, all as more fully set forth in the cited Brightman application. A delay line as used in the terminating line store 128, shown in FIGURE 28 of the cited Brightman application, may comprise a mass of magnetostrictive material disposed between an input amplifier and an output amplifier. The input amplifier responds to negative-going signals applied to its input to apply an input signal to delay lines at the end of a fixed time interval. An output signal from the delay line is applied to the output amplifier. The output of the amplifier is normally maintained at a more positive, or ground, potential and drops to a more negative potential in response to the application of a signal to the input of the output amplifier from the delay line. The delay line provides a delay which corresponds to the length, or time duration, of the time reference frame.

The digit detector and time slot allotter 120 include means for finding and seizing an idle time slot that can be used for determining the presence of a calling condition on any line and means for signaling the calling line store 122 to connect an idle line to the line data highway to permit the digit detector and time slot allotter 120 to make a check for "on-hook and "off-hook" conditions on the connected line.

Other symbols used in the drawing are believed to be well known and widely used in the art and/or will be fully explained in the following detailed description.

*General Description of a TDM System*

The present invention may be used in a time division multiplex system similar to that shown in the cited Brightman application or in other typical time division multiplex communication systems. Only the portion of the system necessary for an understanding of the present invention has been shown in the drawing. A typical time division multiplex communication system includes a plurality of communication circuits that can be connected to a common signal transmission channel, or highway, through a plurality of signal responsive gates. These gates are opened and closed at distinct time positions in a repetitive time frame under the control of signals supplied thereto from a calling line store 122 and a terminating line store 128 in which are circulated, in coded form, the designations of the calling and called lines. Each of the time frames is divided into a plurality of distinct time slots. In general, all of the switching operations of the system are synchronized by a common pulse generator, or clock pulse source, that provides pulses at a predetermined frequency.

The system shown in the drawing includes a plurality of line circuits 100 and 102 that can be coupled together for communication over a two-way speech highway 110 in any assigned one of the plurality of time slots. In addition, the line circuits 100 and 102 are connected together and to common equipment in the system over a line data highway, not shown. Each line circuit is provided with an individual designation. A number of separate communication channels can coexist on the highway 110 which is equal to the number of time slots in the repetitive time frame.

The calling line circuit 100 includes a blocking oscillator 20, having a triggering input connected to terminal B thereof. The triggering input for the calling line circuit is derived from the calling line store 122 through the calling line matrix 124. The blocking oscillator 20, in response to being triggered, applies a pulse of a given width across a normally closed bridge gate, such as bridge gate 21, to effect the opening thereof. The bridge gate 21 of the calling line circuit 100, when open, connects terminal A thereof to the input of a low-pass filter, such as low-pass filter 23. The output from the low-pass filter 23 of the calling line circuit 100 is applied to a utilization means, such as a subscriber tone ringing telephone 24, through an output transformer, such as output transformer 25.

The called line circuit 102 includes a blocking oscillator 30, having a triggering input connected to terminal B thereof. The triggering input for the called line circuit is derived from the terminating line store 128 through the terminating line matrix 130. The blocking oscillator 30, in response to being triggered, applies a pulse of a given width across a normally closed bridge gate, such as bridge gate 31, to effect the opening thereof. The bridge gate 31 of the called line circuit 102, when open, connects terminal A thereof to the input of a low-pass filter, such as low-pass filter 33. The output from the low-pass filter 33 of the called line circuit 102 is applied to a utilization means, such as a subscriber tone ringing telephone 34, through an output transformer, such as output transformer 35.

In order to determine whether one of the line circuits 100 and 102 is in a calling condition and requires the assignment of a time slot, the system includes a calling line store 122 having a ring counter continuously operable to successive settings, each representing one of the line circuits. A digit detector and time slot allotter circuit 120 continuously searches for and assigns idle time slots to the calling line store 122. When an idle time slot is received by the calling line store 122, the counter is advanced and the idle or busy condition of the line circuit represented by the setting of the counter is determined. If the line circuit is busy, the counter is advanced one step to its next setting and the idle time slot is retained for subsequent use. If the line represented by the counter setting is idle, the counter setting is stored in a plurality of delay lines in the calling line store 122 that have a delay equal to one time frame. The counter setting is also applied to a calling line matrix 124. During the following time frame, the on-hook or off-hook condition of the line circuit whose designation is stored in the delay lines is determined.

The calling line matrix 124 translates the counter setting, or circuit designation, into the application of a signal in the assigned time slot to a matrix gate individual to the selected line. The time slot pulse from the matrix gate is supplied to the related line circuit and connects this line circuit to the highway in the allotted time position. If the circuit is in an on-hook condition, and thus does not present a calling condition, the assigned time slot is released for other use, the stored designation is cleared from the delay lines, and the selected circuit is disconnected from the speech highway 110 and the data highway. Alternatively, if an off-hook condition is presented, the time slot allotted to the calling circuit is stored in the busy time slot store to mark this slot as unavailable for use by other calling circuits, the stored designation is circulated in the delay lines in the assigned time position to continuously connect the selected circuit to the highways, and dial tone will be forwarded over the speech highway 110 in the assigned time slot in the manner to be more fully described below.

If the call is to be extended between a pair of line circuits, such as line circuits 100 and 102, the subscriber at the calling line circuit 100 dials the digits necessary to extend the connection. Dialing the necessary digits causes the calling line circuit 100 to supply a number of bursts of time slot pulses from the calling line matrix 124 to the line data highway in the time position assigned to the calling line circuit. The number of bursts of pulses correspond to the number of impulses in each individual digit. The values of the dialed digits are detected by counting circuits in the digit detector and time slot allotter 120 which are effective in the time position assigned to the calling line circuit and which count both the number of time slot pulses in the bursts and the number of clock pulses in the intervals between the bursts. This provides positively controlled means for separating dial impulses from spurious signals.

The values of the dialed digits are stored in delay line registers in a terminating line store 128 in the time position assigned to the calling line circuit. When the complete dialed designation has been stored in the terminating line store 128, this circuit determines whether the circuit represented by the dialed number is in an idle or busy condition. In addition, the delay line registers in the terminating line store 128 control translating circuits in a terminating line matrix 130 so that the called line circuit 102 is connected to the speech highway 110 and the data highway in the same time position as that allotted to the calling line circuit. This permits the terminating line store 128 to determine the on-hook or off-hook condition of the called line circuit.

If the called line circuit 102 is idle, the terminating line store 128 provides a signal to the ringback tone gate 12 in tone generator circuit 10 to request that ringback tone be coupled to the highway 110 in the time slot assigned to the calling line circuit 100 and, in the same time position, triggers the blocking oscillator 20 in calling line circuit 100 to open the bridge gate 21.

If the called line circuit 102 is idle, ringing signals will be coupled to the calling line circuit 100 in response to command signals from the digit detector and time slot allotter 120 directed to the ring tone gate 11. Since the calling line circuit 100 and called line circuit 102 are assigned the same time positions on the speech highway 110, the ring tone signals must be gated to the speech highway 110 and the called line circuit 102 while the ringback tone signals are inhibited from entering the highway 110 in the same time frame. Likewise, the ringback tone signals are gated to the speech highway 110 and the calling line circuit 100 while the ringing tone signals are inhibited from entering the speech highway 110 in the same time frame. Thus, the ringing and ringback tone signals are applied to the speech highway 110 in alternate time frames.

Other functions and details of the operation of these circuits, except for the details of this invention, may be obtained from an examination of the cited Brightman application.

*Description of the Means for Generating Ringing Signals in a Time Division Communication System*

When a line presenting a calling condition is connected to the common communication channel 110, which is commonly referred to as the highway, it is necessary to couple dial tone to the highway in the assigned time slot in order to advise the calling subscriber that the equipment is prepared for him to proceed to dial the designation of the desired called subscriber. The tone is caused to be coupled to the highway in the appropriate time slot by a tone selection circuit, not shown, which responds to a command signal from the digit detector and time slot allotter 120.

Subsequent to the completion of dialing, it is necessary to provide either a busy tone or ringback tone to the calling subscriber's line and a ringing tone to the called line circuit as an indication that the called line is busy or being rung, respectively, as the exigencies of the situation may require.

The ringback tone and the ringing tone originate at the tone generator circuit 10 and, in this case, are caused to be coupled to the speech highway 110 in the appropriate time slot alternately in response to a command signal from the terminating line store 128 and the digit detector and time slot allotter 120, respectively.

The tone generator circuit 10 includes a tone generator 13, a ring tone matching transformer 14, a ringback tone matching transformer 16, and high-speed ring and ringback tone gates 11 and 12, respectively.

In general, all of the switching operations of a time division multiplex system are synchronized by a central pulse generator or clock, not shown, that provides clock pulse signals at a 400 kc. rate. Although other operating frequencies may be used, the present invention will be described in connection with the operating frequencies utilized in the cited Brightman application. In the cited Brightman application, in order to provide thirty-two separate time positions, or slots, on the highway over which the three hundred line circuits and up to one hundred trunks can be interconnected, a frame rate of 12.5 kc., having a duration of eighty microseconds, is selected. Each of the thirty-two time slots has a duration of 2.5 microseconds that can be equally divided between a guard interval and a differentially positioned slot-representing pulse.

Since the command pulses originate in the digit detector and time slot allotter 120, the operating frequency ($f$) of the digit detector and time slot allotter 120 is 12.5 kc. During the ringing and ringback cycle, the calling line store 122 and the terminating line store 128 operate at one-half of the frequency ($f/2$) of the digit detector and time slot allotter 120. The calling line store 122 and the terminating line store 128 operate at 6.25 kc. since the gates in the calling line store 122 and terminating line store 128 are alternately inhibited, as more fully described in the cited Brightman application. In accordance with the invention, the tone generator 13 operates at a signal frequency which is one-quarter of the operating frequency of the digit detector and time slot allotter 120 less a $\delta$ frequency which is one-half a sub-audible frequency, such as five cycles per second. The operating frequency of the tone generator 13 is equal to ($f/4-\delta$), or 3.120 kc. The ring tone gate 11 and ringback gate 12 operate at a frequency $f/2$ which is one-half of the operating frequency of the digit detector and time slot allotter 120. The ring tone gate 11 and the ringback gate 12 may be operated for each time slot since they are high speed gates. The blocking oscillator 30 and bridge gate 31 in the called line circuit operate at a frequency of 6.25 kc., which is the same frequency as the calling line store 122. The blocking oscillator 20 and the bridge gate 21 in the calling line circuit operate at a frequency of 6.25 kc., the same operating frequency as the terminating line store 128.

For illustrative purposes, it will be assumed that the calling line circuit 100 is ringing the called line circuit 102. In this case, ringback tone gate 12 opens in response to a triggering pulse from the calling line store 128 admitting a tone generator signal frequency of 3,120 c.p.s. on the speech highway 110. In the same time slot, the calling store 122 impresses a carrier frequency of 6.250 kc. to the blocking oscillator bridge gate 21 via the calling line matrix 124. The tone generator signal frequency of 3,120 c.p.s. combines with the carrier frequency 6.25 kc. to give an upper sideband of 9,370 c.p.s., a carrier frequency of 6,250 c.p.s., and a lower sideband of 3,130 c.p.s. The tone generator signal frequency 3,120 c.p.s., the upper sideband frequency 9,370 c.p.s., and the lower sideband frequency 3,130 c.p.s. pass the bridge gate 21, all in the same time slot The carrier frequency 6,250 c.p.s. is suppressed by the bridge gate 21 in a manner well known to those skilled in the art. Having passed the bridge gate 21, the upper sideband frequency of 9,370 c.p.s. is attenuated in the low bandpass filter 23, while the lower sideband frequency of 3,130 c.p.s. and the tone generator signal frequency of 3,120 c.p.s. are passed through the low bandpass filter 23. The low bandpass filter 23 has a cutoff frequency between the carrier frequency and the lower sideband frequency, such as 4,000 c.p.s. The output of the low bandpass filter 23 is applied to the subscriber tone ringing telephone 24 through the output transformer 25. The lower sideband frequency of 3,130 c.p.s. and the tone generator signal frequency of 3,120 c.p.s. are added algebraically to produce a beating effect in the subscriber tone ringing telephone transducer, not shown. The beating effect is audible as a warbling ringback tone. The ringback tone warbles at the sub-audible frequency. Since the lower sideband frequency of 3,130 c.p.s. and the tone generator frequency of 3,120 c.p.s. are added algebracially, signal amplification is achieved by the present invention.

During the alternate time frame, the called line circuit 102 is connected to the speech highway 110 by the opening of bridge gate 31, which is in synchronism with the ring tone gate 11. The tone generator signal of 3,120 c.p.s. is applied to the highway 110 via the ring tone gate 11 in response to a command signal from the terminating line store 128. The tone generator signal frequency of 3,120 c.p.s. combines with the carrier frequency of 6,250 c.p.s. to give an upper sideband of 9,370 c.p.s. and a lower sideband of 3,130 c.p.s. The bridge gate 31 suppresses the carrier frequency 6,250 c.p.s. in a manner well know to those skilled in the art. The low bandpass filter 33 attenuates the upper sideband frequency of 9,370 c.p.s., and passes the lower sideband frequency of 3,130 c.p.s. and the tone generator signal frequency of 3.120 c.p.s. The output of the low bandpass filter 33 is coupled to the subscriber tone ringing telephone 34 through the output transformer 35. The lower sideband frequency of 3,130 c.p.s. and the tone generator signal frequency of 3,120 c.p.s. are added algebracially to produce a beating effect in the subscriber tone ring telephone transducer, not shown. The beating effect is audible as a warbling ringing tone.

As was mentioned heretofore, the operating frequency of the time division multiplex system can operate at other operating frequencies; in which case, the tone generator 13 operates at a signal frequency which is one-quarter of the operating frequency of the digit detector and time slot allotter 120 less a ($\delta$) frequency which is one half a sub-audible frequency, such as five cycles per second. For example, if the operating frequency of a time division multiplex system has a switching rate of 10 kc., then the digit detector and time slot allotter would have an operating frequency of 10 kc., the calling line store 122 and terminating line store 128 would have a switching rate of 5 kc. during the ringing and ringback cycle. The ring tone gate 11 and ringback tone gate 12 would operate at a switching rate of 10 kc. The tone generator 13, in accordance with the invention, would operate at a ($f/4-\delta$), or 2,495 c.p.s., which is slightly less than one-quarter of the 10 kc. switching rate of the digit detector and time slot allotter 120. The 5 kc. frequency rate of the calling line store 122 and the terminating line store 128 acts as the carrier frequency and combines with the 2,495 c.p.s. frequency of the tone generator 13 to produce an upper sideband frequency of 7,495 c.p.s. and a lower sideband frequency of 2,505 c.p.s. The upper sideband frequency of 7,495 c.p.s. is attenuated in the low bandpass filters 23 and 33 since the cutoff frequency is intermediate the carrier frequency and the lower sideband frequency. The tone generator signal frequency of 2,495 c.p.s. and the lower sideband frequency of 2,505 c.p.s. are combined and provides the desired beating effect, or audible warbling tone, in the transducer in the subscriber tone ringing telephone.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed and desired to be secured by Letters Patent of the United States is:

1. In combination, first and second normally closed bridge gates, a common highway interconnecting said first and second bridge gates, means for periodically opening said first and second bridge gates in synchronism at a first given frequency, a ring tone generator producing a ring tone audible signal frequency which differs from one-half of said first frequency by one-half a sub-audible frequency, means for applying said ring tone audible signal frequency as an input signal to said first bridge gate, a tone ringing telephone set having a tone ringer responsive to said ring tone audible signal frequency, and means including a low-pass filter having a cutoff frequency intermediate said first frequency and said ring tone audible signal frequency for applying the output of said second bridge gate to said telephone set, whereby said tone ringer produces a ring tone at said audible signal frequency which warbles at said sub-audible frequency.

2. In combination, a plurality of normally closed called party bridge gates, a tone ringing gate, a common highway connected to said plurality of called party bridge gates and said tone ringing gate, means for periodically opening one of said plurality of called party bridge gates in synchronism with the opening of said tone ringing gate at a first given frequency, a ring tone generator producing a ring tone audible signal frequency which differs from one-half of said first frequency by one-half a sub-audible frequency, means for applying said ring tone audible signal frequency as an input signal to said one of said called party bridge gates in response to the opening of said tone ringing gate, a tone ringing telephone set having a tone ringer responsive to said ring tone audible signal frequency, and means including a low-pass filter having a cutoff frequency intermediate said first frequency and said ring tone audible signal frequency for applying the output of said one of said called party bridge gates to said telephone set, whereby said tone ringer produces a ring tone at said audible signal frequency which warbles at said sub-audible frequency.

3. In combination, first and second normally closed bridge gates, a common highway interconnecting said first and second bridge gates, means for periodically opening said first and second bridge gates in synchronism at a frequency of 5000 cycles per second, a ring tone generator producing a ring tone audible signal frequency of 2495 cycles per second which differs from one-half of said first frequency by one-half a sub-audible frequency of 10 cycles per second, means for applying said ring tone audible signal frequency as an input signal to said first bridge gate, a tone ringing telephone set having a tone ringer responsive to said audible signal frequency, and means including a low-pass filter having a cutoff frequency intermediate said first frequency and said ring tone audible signal frequency for applying the output of said second bridge gate to said telephone set, whereby said tone ringer produces a ring tone which warbles at 10 cycles per second.

4. In combination, first and second normally closed bridge gates, a common highway interconnecting said first and second bridge gates, means for periodically opening said first and second bridge gates in synchronism at a frequency of 6250 cycles per second, a ring tone generator producing a ring tone audible signal frequency of 3120 cycles per second which differs from one-half of said first frequency by one-half a sub-audible frequency of 10 cycles per second, means for applying said ring tone audible signal frequency as an input signal to said first bridge gate, a tone ringing telephone set having a tone ringer responsive to said audible signal frequency, and means including a low-pass filter having a cutoff frequency intermediate said first frequency and said ring tone audible signal frequency for applying the output of said second bridge gate to said telephone set, whereby said tone ringer produces a ring tone which warbles at 10 cycles per second.

5. In combination, first and second normally closed bridge gates, a common transmission line interconnecting said first and second bridge gates, means for periodically opening said first and second bridge gates in synchronism at a given carrier frequency, a ring tone generator producing a ring tone audible signal frequency which differs from one-half of said given carrier frequency by one-half a subaudible frequency, means for applying said ring tone audible signal frequency as an input signal to said first bridge gate through said common highway whereby said ring tone audible signal frequency combines with said given carrier frequency to produce upper sideband frequencies and lower sideband frequencies, a tone ringing telephone set having a tone ringer responsive to said ring tone audible signal frequency and said lower sideband frequency, and means including a low-pass filter having a cutoff frequency intermediate said carrier frequency and said ring tone audible signal frequency for applying the output of said bridge gate to said telephone set whereby said tone ringer produces a ring tone which warbles at said subaudible frequency in response to said audible signal frequency and said lower sideband frequency.

References Cited in the file of this patent

UNITED STATES PATENTS

| | | |
|---|---|---|
| 2,438,903 | Deloraine et al. | Apr. 6, 1948 |
| 2,546,974 | Chatterjea et al. | Apr. 3, 1951 |
| 2,953,779 | Brown | Sept. 20, 1960 |
| 3,003,041 | Faulkner | Oct. 3, 1961 |
| 3,026,377 | Sullivan | Mar. 20, 1962 |